US 6,600,834 B1

United States Patent
Su et al.

(10) Patent No.: US 6,600,834 B1
(45) Date of Patent: Jul. 29, 2003

(54) HANDWRITING INFORMATION PROCESSING SYSTEM WITH CHARACTER SEGMENTATION USER INTERFACE

(75) Inventors: Hui Su, Beijing (CN); Donald T. Tang, Beijing (CN); Qian Ying Wang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/481,156

(22) Filed: Jan. 12, 2000

(30) Foreign Application Priority Data

Jan. 13, 1999 (CN) ........................... 99100939 A

(51) Int. Cl.⁷ ................................. G06K 9/00
(52) U.S. Cl. ................... 382/187; 382/188; 382/177
(58) Field of Search ................. 382/173, 176, 382/177, 185, 186, 187, 188, 189, 202, 203, 215

(56) References Cited

U.S. PATENT DOCUMENTS 5,870,492 A * 2/1999 Shimizu et al. ............. 382/187
6,389,166 B1 * 5/2002 Chang et al. ............... 382/188
6,408,092 B1 * 6/2002 Sites ........................... 382/187

FOREIGN PATENT DOCUMENTS

| JP | 64-010395 | 1/1989 |
| JP | 6-110993 | 4/1994 |
| JP | 6-266899 | 9/1994 |
| JP | 7-044657 | 2/1995 |
| JP | 7-057053 | 3/1995 |
| JP | 8-161426 | 6/1996 |
| JP | 10-097591 | 4/1998 |

* cited by examiner

Primary Examiner—Phuoc Tran
(74) Attorney, Agent, or Firm—Thu Ann Dang

(57) ABSTRACT

This invention discloses a handwriting information processing system, comprising handwriting information input means and handwriting information recognition means, said handwriting information input means and said handwriting information recognition means co-operate for accepting and recognizing a user's handwriting input, said handwriting information processing system is characterized by further comprising a character segmentation user interface for accepting the definitions of text/picture areas, handwriting lines and character boundaries from a user.

15 Claims, 3 Drawing Sheets

TIME SCROLL BAR      TIME PERIOD WINDOW

ThinkScribe Chinese handwriting

HANDWRITING INFORMATION PROCESSING SYSTEM WITH CHARACTER SEGMENTATION USER INTERFACE

The present invention relates to handwriting information processing system, and more particularly to handwriting information processing system with a user interface for character segmentation.

With the quick development of computer technologies, there appear many information processing devices for accepting users' handwriting input, such as personal digital assistants PDA or hand portable computers HPC. Users can input handwritten data and symbols into computers by means of pen-like devices. Correspondingly, there appear many handwritten characters recognition devices, which can recognize a user's handwriting input.

The IBM's ThinkScribe is a device integrating a handwriting digitizer with a traditional paper-based recording system. This device records a user's handwriting input in strokes and associated timing and can reproduce the user's handwriting input according to the original timing information. When users write Chinese characters on ThinkScribe, they usually write characters continuously with little or without any space in-between characters. And sometimes, users even overlap strokes of adjacent characters or connect the last stroke of the preceding character with the first stroke of the latter character. This makes the character segmentation a problem before recognition.

At present, there are no effective character segmentation methods, particularly for handwritten Chinese characters. The handwritten character recognition technologies can only recognize an individual Chinese character or handwritten Chinese character strings with big spaces. The difficulties of automatically segmenting handwritten Chinese character strings lie in:

1) Many Chinese characters have separable components lined up from left to right. When writing quickly in a horizontal line from left to right, the distance between such components may be similar to that between two characters. In addition to this spatial confusion, the left and right parts of those characters are often themselves single characters, or may resemble some characters. Similar statements can be made for Chinese characters written in a vertical line, since many Chinese characters have separable components stacked up from top to down.

2) For adjacent characters, when writing cursively, the end stroke of the first character and the beginning stroke of the second character may not be clearly separated with each other.

In addition, the text areas may overlap the picture areas and the handwriting lines may be not always very straight. In such a case, the automatic techniques for detecting the text areas, finding out the handwriting lines, and segmenting the individual characters in a string for recognition are not always reliable and accurate. A manual procedure is needed for such work.

Therefore, the present invention provides a handwriting information processing system, which comprises a user interface for accepting the definition of text/picture areas, handwriting lines and character boundaries from a user.

With the interface, a user can define the text/picture areas. The automatic line detecting mechanism can find out the handwriting lines by use of the information. A user can also correct errors in the automatic layout analysis with the information.

In addition, the user interface for character segmentation according to the present. invention provides an effective and natural definition handwriting line mode. By use of the information, the automatic character segmentation mechanism can find out the character boundaries and can correct errors in the automatic recognition process with the information.

The user interface for character segmentation according to the present invention provides a method for effectively defining character boundaries. By use of the information, the automatic recognition mechanism can recognize continuously written characters, and can also correct errors in automatic recognition with the information.

The following descriptions of an embodiment of the present invention in connection with the accompanying drawings can make the objects, features and advantages of the present invention more clear:

Figure 1:
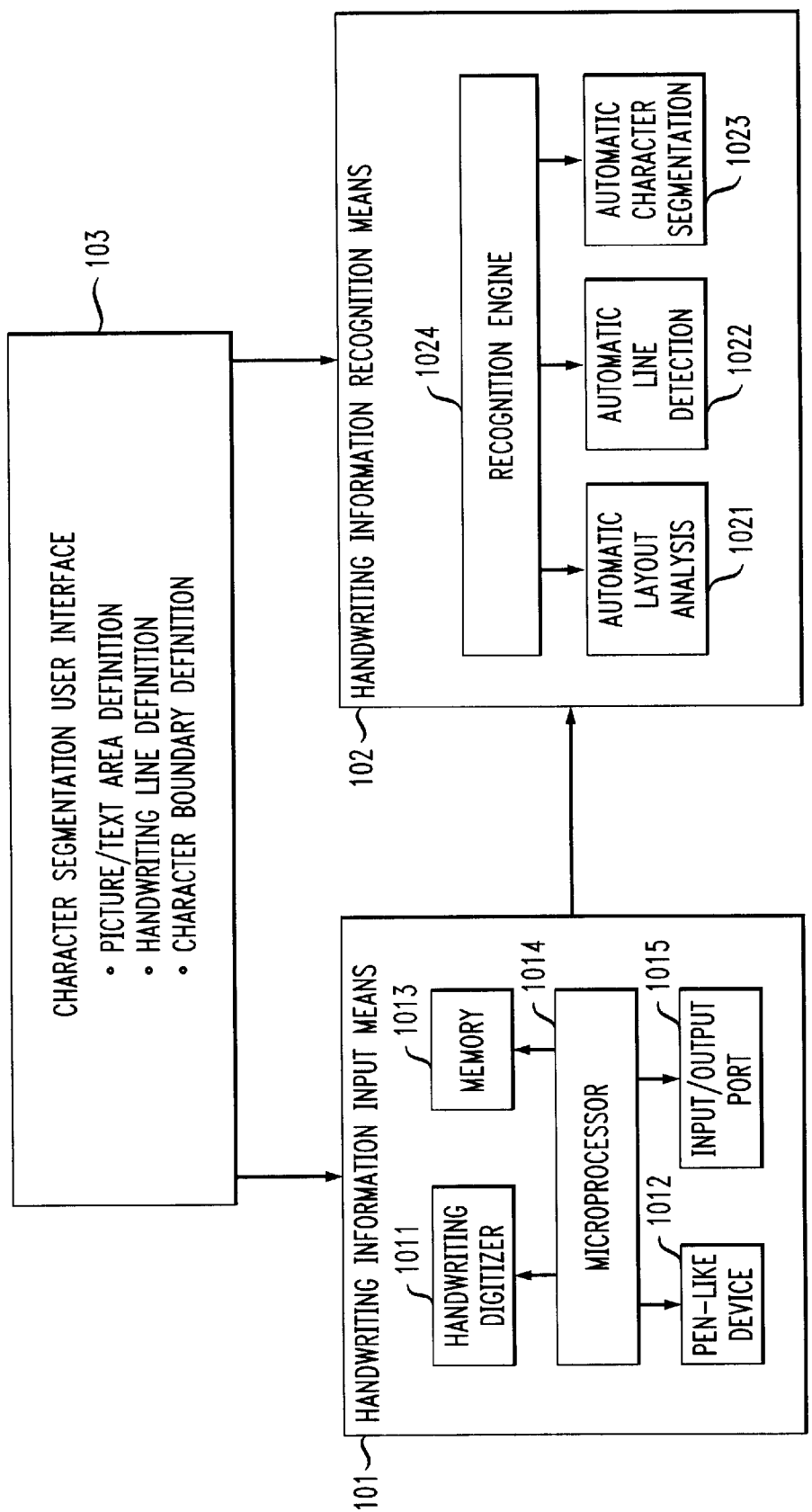
FIG. 1 is a block chart illustrating the handwriting information processing systems of the present invention with a user interface for character segmentation.

FIG. 1 takes IBM's ThinkScribe (as the handwriting information input means) for example to describe a handwriting information processing system 100 with a user interface for character segmentation according to the present invention.

As shown in FIG. 1, the handwriting information processing system 100 is composed of handwriting information input means 101 and handwriting information recognition means 102. The handwriting information input means 101 is normally composed of a writing pad and a writing pen. As shown in FIG. 1, the handwriting information input means 101 comprises a handwriting digitizer 101 1, a pen-like device 1012, a memory 1013, a processor 1014 and an input/output port 1015. The writing pad can generate data representative of the moving trace of the pen. IBM's ThinkScribe can be used as handwriting information input means. When a user writes on the writing pad with a pen-like means, ThinkScribe can record the user's handwriting input in strokes and relevant timing sequence. Each handwritten stroke is represented by a series of discrete coordinate points in strokes, for example, the ith handwritten stroke can be expressed as:

$$S(i)=((x(i, 1), y(i, 1), t(i, 1)), \ldots, (x(i,j), y(i,j), t(i,j)), \ldots, (x(i, e(i)), y(i,e(i)), t(i,e(i))))$$

where e(i) represents the number of stroke points in stroke i, t(i,j) is the timing sequence information. Then, a user's handwriting input can be represented by data flow S(1), S(2), S(3) . . . ThinkScribe can store the data flow S(1), S(2), S(3) . . . in its nonvolatile memory 1013 and can also send it through input/output port 1015 to, for example, a personal computer PC when necessary. The PC may include a processor, associated memory and input/output devices for implementing one or more of the elements shown in FIG. 1

Of course the invention may be implemented in accordance with one or more other processor-based devices which comprise a processor, associated memory and input/output devices. The PC can run the handwriting input reproducing program of ThinkScribe, and reproduce a user's handwriting input in the original timing sequence. The PC can be used as a recognition device for recognizing a user's handwriting input when recognition program has been loaded into the PC. As shown in FIG. 1, the handwriting information recognition means 102 normally performs pre-process, such as the layout analysis 1021, handwriting line identification 1022 and character segmentation 1023 before making recognition in accordance with the recognition engine 1024 so as to identify the text/picture areas and recognize the characters in the handwriting lines. However, the current handwriting recognition technologies are not mature. Therefore, the results of the automatic layout analysis, automatic handwriting line identification and automatic character segmentation are not reliable and manual procedures are needed. The character segmentation user interface of the present invention provides such a function. As shown in FIG. 1, the character segmentation user interface 103 is composed of three parts: text/picture area definition section for accepting a user's definition of the text/picture areas, the handwriting recognition means capable of automatically determining the handwriting lines or automatically correcting the results of the layout analysis with the help of this information; handwriting line definition section for accepting a user's definition of the handwriting lines, the handwriting recognition means capable of automatically determining the character boundaries or correcting the results of automatic recognition with the help of this information; and, character boundary definition section, a user being able to determine character boundaries manually or being able to correct the results of automatic character segmentation. All or portions of the interface 103 may be implemented in accordance with the processor, memory and input/output devices of the handwriting information recognition means 102 and/or the handwriting information input means 101. Alternatively, it may be implemented with its own processor, memory and input/output devices.

The following illustrates in detail the three main components of the character segmentation user interface of the present invention in connection with the accompanying drawings.

The layout analysis normally means locating picture blocks and text blocks in the whole handwriting area. Of course, there exist some automatic layout analysis methods. However, since they are not reliable, manual procedures are needed.

Figure 2:
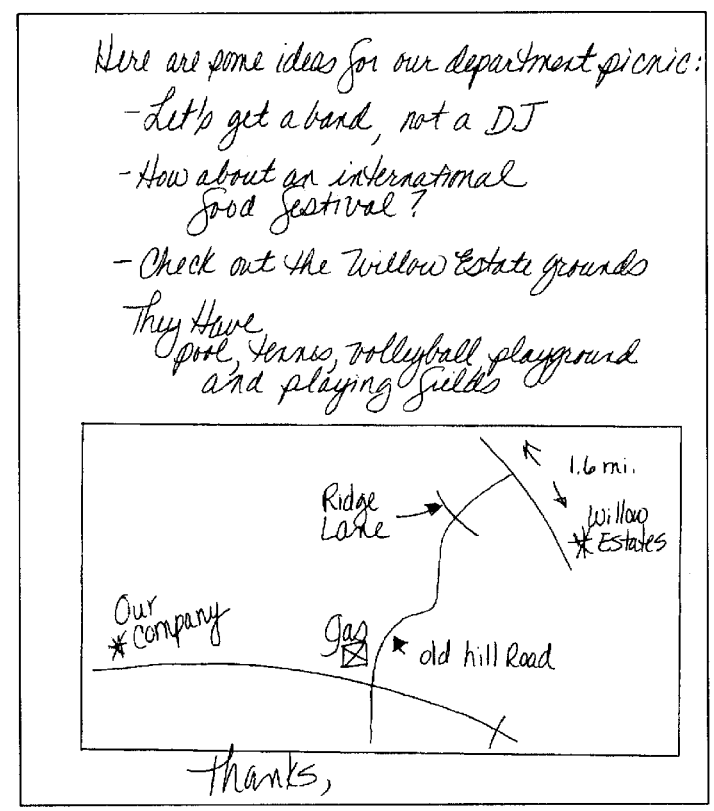
FIG. 2 illustrates the working condition of the user interface of the present invention for character segmentation when accepting the user's definition of the text/picture areas.
Figure 2:
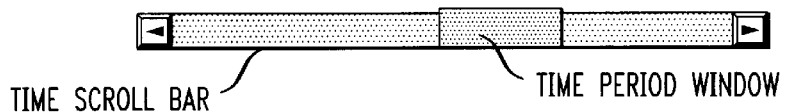

As shown in FIG. 2, when a user defines the text/picture areas by means of the user interface of the present invention for character segmentation, he has taken advantage of the timing information. For ThinkScribe data, the basic component is strokes. Both the text and picture blocks are composed of groups of strokes. Not only position information but also timing information of strokes are recorded, and the ThinkScribe data is often written separately. That is to say, the strokes of text and those of picture are often written in different time period. Thus, as shown in FIG. 2, a UI (user interface) scroll bar can be used. On the time scroll bar, one time period window with variable size can be used to separate group of strokes. A user can change the time period in the window to select the stroke groups. The selected strokes can be highlighted with different color. In FIG. 2, the selected strokes which belong to picture block are highlighted with green color.

There exists significant difference between ordinary manual layout analysis of OCR and the text/picture area definition method of the present invention. For OCR, a user can only draw a rectangle to select different picture area. But, the present invention has taken advantage of data characteristics of such device of ThinkScribe, using the stroke-based data and also the time sequence information to define the picture/text areas. Defining picture/text areas with rectangle has many limitations. As shown in FIG. 2, if the rectangle is used to select the strokes belonging to a picture block, some strokes from a text block will be erroneously selected as a part of the picture.

Figure 3:
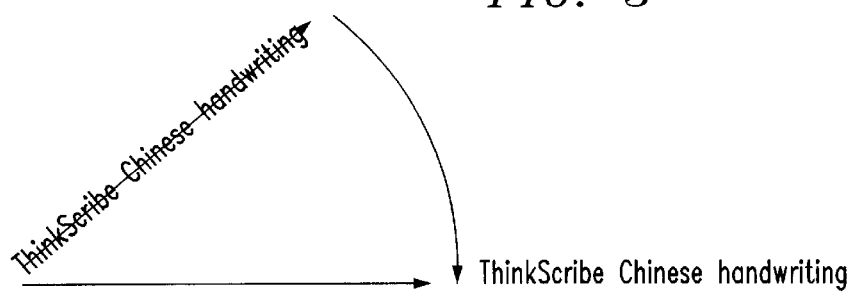
FIG. 3 illustrates the working condition of the user interface of the present invention for character segmentation when accepting the user's definition of the handwriting lines.

FIG. 3 illustrates the working condition of the user interface according to the present invention for character segmentation when accepting a user's definition on handwriting lines. For text block recognition, identifying the handwriting lines is a very important step. Obviously, the UI for distinguishing text and picture blocks can be used for detecting handwriting lines manually. But, this is not enough. Sometimes, a user writes a line of characters neither horizontally nor vertically, but with some angle. That is to say, skew correction is necessary. In UI, when a user makes a starting point S and an ending point E with a cursor or other input means, the UI of the present invention makes an analysis according to the time sequence information, making the strokes at the starting point S and the ending point E as a stroke group according to the time sequence information and automatically determining the writing direction according to the direction of the handwriting line. And the results are displayed to the user in the UI as shown in FIG. 3. When this direction is not consistent with the default direction of the system, one of them can be adjusted. For example, as shown in FIG. 3, when the direction of the handwriting line determined by the UI according to the starting point S and ending point E defined by the user definition inclines against the horizontal direction, the user can drag the end of the allow and rotate it. The selected and highlighted strokes is rotated with an angle.

Figure 4:
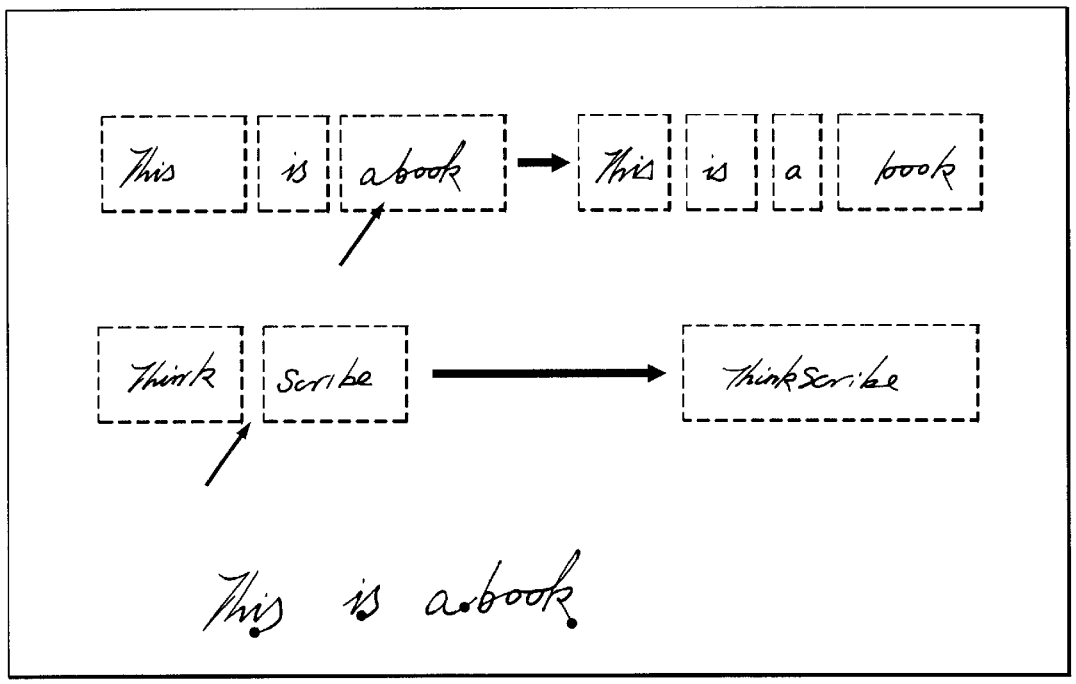
FIG. 4 illustrates the working condition of the user interface of the present invention for character segmentation when accepting the user's definition of the character boundaries.

The following descriptions in connection with FIG. 4 explain the manual character segmentation and the correction of results of the automatic character segmentation by the UI of the present invention.

For cursive Chinese handwriting, there is no enough space between characters. Sometimes, between the adjacent characters, the last stroke of the preceding character is connected with the first stroke of following character. In. such a case, the result of the automatic character segmentation is not reliable and manual correction is needed.

The character boundary can be defined by a user at the same time when he is writing. For example: Designing a new button on ThinkScribe When a user writes on ThinkScribe, he/she can click this button when finishing each character to indicate that the writing of the character is finished. The firmware of ThinkScribe is modified so that the ending tag of a character transformed from the signal of the button, the stroke data and the time sequence information are recorded together. When the recorded data is transferred to PC for recognition, the recognition software (including tag interpreter and recognition engine) will segment the data of ThinkScribe and feed the stroke groups representing each isolated character to the recognition engine for recognition.

Designing a special paper format for ThinkScribe

This design includes a page format generator, a tag generator and a recognition software.

1) The page format generator has the function to design special formats on a page with grids on it. User are allowed to write in each grid on the printed page with such a format. The page format information such as size and position of grid can also be downloaded to ThinkScribe firmware.

2) The tag generator is implemented in firmware. It compares the format information downloaded from the PC with the strokes written on ThinkScribe. If the tag generator detects any stroke written in a grid, it will tag the grid label with this stroke. Later when the recorded data is transferred to PC for recognition, the recognition software (including tag interpreter and the recognition engine) will group the strokes which have the same grid tag as one separate character and feed isolated characters to the recognition engine for recognition. When recorded data is transferred to PC, the recognition software (also including tag interpreter and the recognition engine) on PC will first group the strokes with tags related with the same grid together and feed them as an isolated character to the engine for recognition.

Designing a new button on the writing pen

Similar to the design of a new button on ThinkScribe writing pad, a button on the writing pen can be used to send the information indicating that the writing of a character is finished.

The above descriptions have introduced the manual character segmentation, i.e., a user interface for identifying character boundaries.

In addition, the user interface according to the present invention for character segmentation can also be used to correct the results of the automatic character segmentation. The correction includes two kinds of work: splitting and merging strokes, as shown in FIG. 4. When more than one characters are segmented to be one, splitting is used. When part of one character is segmented to be one, merging is used. The following is an example of such kind of tools:

Because stroke-based ThinkScribe data is recorded on-line but recognized off-line, UI of the present invention is also designed to be stroke based. After the automatic segmentation is finished, the segmentation result is displayed in such a way that the strokes belong to one segmented character are boxed in one block. (The adjacent boxed blocks are disjointed only if the vertical gap exists in between. This shall not be the case when only the horizontal separation, and not the vertical gap, exists.)

If a user wants to perform a merge operation, he/she can drag the mouse to include the blocks he/she wants to merge. Then the strokes in these blocks are merged together to be one character in one block.

For splitting operation, a user needs to first select the block he/she wants to split. The strokes in this block are highlighted. Then after the user selects one stroke, the system will pop up a question to ask the user whether he/she wants to split the stroke to be part of the character in the left block or part of the character in the right block or even he/she wants to split the stroke two connected characters. After the user selects one option, the system will perform the function. If the user wants to split the stroke, he/she needs to point to one position to split.

An alternative method according to the present invention is proposed as follows: the system will display candidate character boundaries obtained through automatic segmentation process by showing a little circle at the end of each character ending stroke point. The circle can be added or deleted by moving the cursor to the position and click it. The following two cases need to be considered:

(1) If a user wants to merge two adjacent "candidate characters", he/she simply moves the cursor to the circle separating them and click it. A pop up menu will appear. If the user selects the merging item, the circle will disappear and two candidate characters will be considered just components of a new character. This procedure may be repeated to merge more than two candidate characters.

(2) If a user wants to separate a single "candidate character" into to two, he/she then may move the cursor to the end of the desired correct bounding stroke and click it. A pop up menu will appear. If the user selects the splitting-character item, a circle will appear and the candidate character will be split into two. If the last stroke of the a character and the first stroke of the next character are connected, the user may move the cursor to the middle of the connecting stroke and click it to pop up menu. If the user selects the splitting-stroke item, a circle will appear and the candidate character will be split into two accordingly. This procedure may also be repeated to split the candidate character into more than two characters.

The above in connection with the drawings illustrates the working conditions of the user interface according to the present invention for character segmentation.

Figure 5:
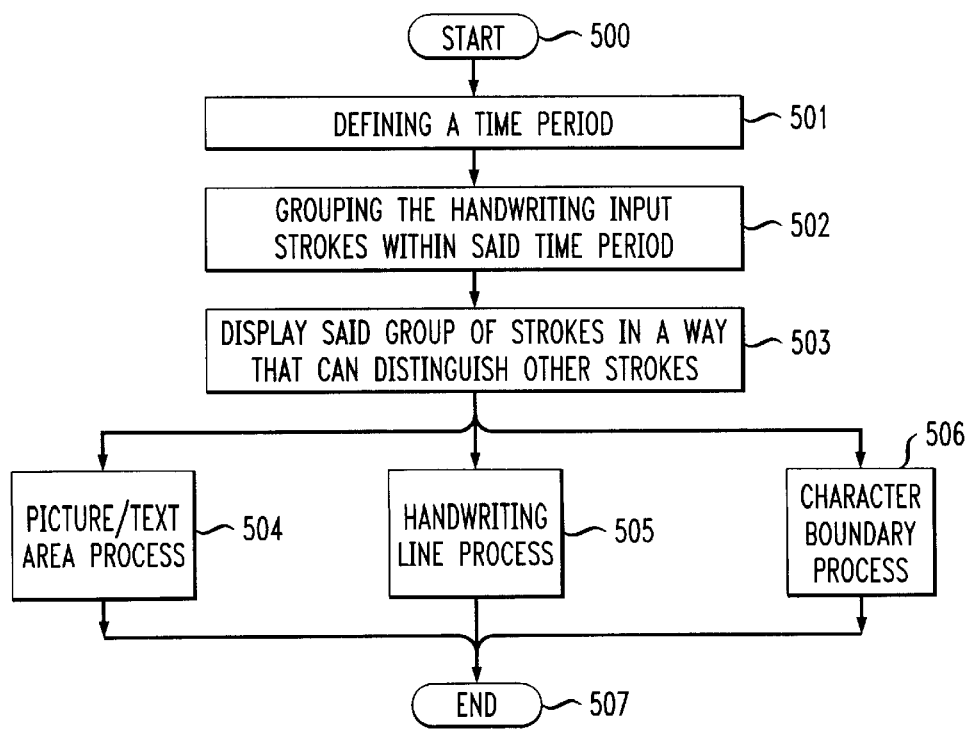
FIG. 5 is a flow chart illustrating the method of the present invention for defining text/picture areas, handwriting lines and character boundaries in the handwriting information processing systems.

The present invention also provides a method for defining text/picture areas, handwriting lines and character boundaries in a handwriting information processing system, said handwriting information processing system is composed of handwriting information input means and handwriting information recognition means, which co-operate for accepting and recognizing a user's handwriting input, wherein said handwriting information input means records the user's handwriting input in strokes and associated timing information thereof. As shown in FIG. 5, the method of the present invention for defining text/picture areas, handwriting lines and character boundaries comprises the steps of: step S501 for defining a time period; step S502 for grouping the handwriting input strokes within said time period; step S503 for displaying said group of strokes in a way that can distinguish other strokes; steps S504, S505 and S506 for defining said group of strokes to form a text/picture area, a handwriting line or a character and perform the corresponding processes.

The above descriptions in connection with the accompanying drawing have depicted the handwriting information processing systems with a user interface according to the present invention for character segmentation and a method for defining text/picture areas, handwriting lines and character boundaries in a handwriting information processing system. As understood by a person skilled in the art, the present invention is not limited to the above examples. Under the premise that the spirit and scope of the present invention are not violated, various amendments and changes can be made to the present invention. The present invention aims at including all these amendments and changes. The protection scope of the present invention is defined by the attached claims.

What is claimed is:

1. A handwriting information processing system, comprising:

handwriting information input means;

handwriting information recognition means, wherein said handwriting information input means and said handwriting information recognition means co-operate for accepting and recognizing a user's handwriting input; and a character segmentation user interface for accepting definitions of text/picture areas, handwriting lines and character boundaries from a user for use in association with at least one of said handwriting information input means and said handwriting information recognition means.

2. A handwriting information processing system according to claim 1, wherein said handwriting information input means records said user's handwriting input in strokes and associated timing information thereof, and the user is permitted to group said strokes by means of said timing information in order to define text/picture areas, handwriting lines and character boundaries.

3. A handwriting information processing system according to claim 1, wherein said handwriting information recognition means at least one of automatically determines lines of character strings and corrects errors in automatic layout analysis results by means of said user's definition of text/picture areas.

4. A handwriting information processing system according to claim 1, wherein said character segmentation user interface accepts user's definitions of a start point and an end point of a handwriting line, and automatically determines a direction of the handwriting line.

5. A handwriting information processing system according to claim 1, wherein when a direction of a handwriting line defined by a user is not consistent with a default direction of the system, said character segmentation user interface adjusts at least one of the user defined direction and the default direction.

6. A handwriting information processing system according to claim 1, wherein said handwriting information recognition means at least one of automatically determines character boundaries and corrects errors in an automatic handwriting line identification by means of said user's definition of a handwriting line.

7. A handwriting information processing system according to claim 1, wherein said handwriting information input means comprises a writing pad and a writing pen, and a user is permitted to define character boundary by means of a button on the writing pad.

8. A handwriting information processing system according to claim 1, wherein said handwriting information input means comprises a writing pad and a writing pen, and a user is permitted to define character boundary by means of a button on the writing pen.

9. A handwriting information processing system according to claim 1, wherein said handwriting information input means is a device integrating a handwriting digitizer with a paper-based recording system, and a user is permitted to define character boundary by defining writing format on paper.

10. A handwriting information processing system according to claim 1, wherein said handwriting information recognition means corrects errors in the automatic character segmentation results by means of said user's definition of character boundaries.

11. A handwriting information processing system according to claim 1, wherein the user is permitted to correct errors in the automatic character segmentation based on strokes through said character segmentation user interface.

12. A handwriting information processing system according to claim 11, wherein said character segmentation user interface automatically splits the results of automatic character segmentation at a position pointed out by the user, and divides them into two groups of strokes.

13. A handwriting information processing system according to claim 11, wherein said character segmentation user interface automatically merges the results of automatic character segmentation at the position pointed out by a user.

14. A method for defining text/picture areas, handwriting lines and character boundaries in a handwriting information processing system, said handwriting information processing system comprising handwriting information input means and handwriting information recognition means, which co-operate for accepting and recognizing a user's handwriting input, wherein said handwriting information input means record the user's handwriting input in strokes and associated timing information thereof, said method comprising the steps of:

defining a time period;

grouping the strokes input by a user in said time period;

displaying said group of strokes in a mode distinguishing from other strokes; and defining said group of strokes to form at least one of a text/picture area, a handwriting line and a character.

15. Apparatus for defining text/picture areas, handwriting lines and character boundaries in a handwriting information processing system, said handwriting information processing system being composed of handwriting information input means and handwriting information recognition means, which co-operate for accepting and recognizing a user's handwriting input, wherein said handwriting information input means record the user's handwriting input in strokes and associated timing information thereof, said apparatus comprising:

at least one processor operative to: (i) define a time period; (ii) group the strokes input by a user in said time period; (iii) display said group of strokes in a mode distinguishing from other strokes; and (iv) define said group of strokes to form at least one of a text/picture area, a handwriting line and a character.

* * * * *